(12) United States Patent
Halimi et al.

(10) Patent No.: US 11,153,224 B2
(45) Date of Patent: *Oct. 19, 2021

(54) METHOD OF PROVIDING CLOUD COMPUTING INFRASTRUCTURE

(71) Applicant: RADCOM LTD., Tel Aviv (IL)

(72) Inventors: Alon Halimi, Alon Shvut (IL); Tal Yaniv, Kfar Saba (IL); Tomer Tuvia Ilan, Rosh Haayin (IL)

(73) Assignee: RADCOM LTD., Tel Aviv (IL)

( * ) Notice: Subject to any disclaimer, the term of this patent is extended or adjusted under 35 U.S.C. 154(b) by 0 days.

This patent is subject to a terminal disclaimer.

(21) Appl. No.: 15/708,176

(22) Filed: Sep. 19, 2017

(65) Prior Publication Data

US 2018/0225153 A1     Aug. 9, 2018

Related U.S. Application Data

(60) Provisional application No. 62/456,693, filed on Feb. 9, 2017.

(51) Int. Cl.
   *H04L 12/911*  (2013.01)
   *H04L 29/08*  (2006.01)
   *G06F 9/455*  (2018.01)
   *G06F 9/50*  (2006.01)

(52) U.S. Cl.
   CPC .......... *H04L 47/70* (2013.01); *G06F 9/455* (2013.01); *G06F 9/45533* (2013.01); *G06F 9/45558* (2013.01); *G06F 9/5077* (2013.01); *H04L 47/781* (2013.01); *H04L 67/10* (2013.01); *H04L 67/306* (2013.01); *G06F 2009/45595* (2013.01)

(58) Field of Classification Search
   CPC ..... H04L 47/70; H04L 41/00; H04L 29/0857; G06F 9/455; G06F 9/00; G06Q 30/0206
   USPC ........................................................ 709/226
   See application file for complete search history.

(56) References Cited

U.S. PATENT DOCUMENTS

| | | | |
|---|---|---|---|
| 8,352,941 B1 | 1/2013 | Protopopov et al. | |
| 8,443,365 B2* | 5/2013 | Kumar | G06F 9/45558 714/1 |
| 8,863,124 B1* | 10/2014 | Aron | G06F 9/45533 709/223 |
| 8,869,300 B2 | 10/2014 | Singh et al. | |
| 8,909,780 B1 | 12/2014 | Dickinson et al. | |
| 8,924,542 B1* | 12/2014 | Gabrielson | H04L 12/4641 709/224 |

(Continued)

FOREIGN PATENT DOCUMENTS

| CN | 111936974 A | * | 11/2020 | ........... G06F 9/5072 |
|---|---|---|---|---|
| WO | WO-2013119554 A1 | * | 8/2013 | ........... G06F 9/5027 |

(Continued)

OTHER PUBLICATIONS

Techterms, "template", 2019 (Year: 2019).*

(Continued)

*Primary Examiner* — Ondrej C Vostal
(74) *Attorney, Agent, or Firm* — A.C. Entis-IP Ltd.; Allan C. Entis

(57) ABSTRACT

A method of providing an infrastructure of virtual resources in a cloud comprising automatically provisioning the virtual resources with other virtual resources with which to communicate to access data they need to provide functionalities to the infrastructure.

15 Claims, 2 Drawing Sheets

(56) References Cited

U.S. PATENT DOCUMENTS

| | | |
|---|---|---|
| 8,997,096 B1 | 3/2015 | Protopopov et al. |
| 9,166,947 B1 | 10/2015 | Tian et al. |
| 9,372,709 B2* | 6/2016 | Ciano ................ G06F 9/45533 |
| 9,374,294 B1* | 6/2016 | Pani ...................... H04L 41/082 |
| 9,407,539 B1* | 8/2016 | Dickinson ............. G06F 9/5061 |
| 9,430,295 B1* | 8/2016 | Eizadi ................ G06F 9/45558 |
| 10,079,797 B2 | 9/2018 | Uriel |
| 10,171,371 B2* | 1/2019 | Anwar ............... H04L 67/1095 |
| 10,212,050 B2* | 2/2019 | Gupte ................... G06F 9/5072 |
| 10,382,532 B2* | 8/2019 | Thakkar ............. H04L 12/4641 |
| 10,411,985 B1* | 9/2019 | Miller ..................... H04L 43/06 |
| 2005/0147062 A1* | 7/2005 | Khouaja ............... H04W 36/30 |
| | | 370/332 |
| 2010/0180014 A1* | 7/2010 | Kannan ............... H04L 61/2007 |
| | | 709/220 |
| 2011/0055378 A1* | 3/2011 | Ferris ...................... H04L 43/00 |
| | | 709/224 |
| 2011/0055398 A1* | 3/2011 | Dehaan ............... H04L 12/4641 |
| | | 709/226 |
| 2011/0119382 A1 | 5/2011 | Shaw, Jr. et al. |
| 2011/0142053 A1* | 6/2011 | Merwe .................... H04L 47/72 |
| | | 370/395.1 |
| 2011/0214176 A1 | 9/2011 | Burch et al. |
| 2011/0307889 A1* | 12/2011 | Moriki ................ G06F 11/3495 |
| | | 718/1 |
| 2012/0102190 A1* | 4/2012 | Durham ............. H04L 41/0823 |
| | | 709/224 |
| 2012/0131468 A1* | 5/2012 | Friedlander ......... H04L 41/0836 |
| | | 715/735 |
| 2012/0137002 A1* | 5/2012 | Ferris .................... G06F 9/5072 |
| | | 709/226 |
| 2013/0132545 A1* | 5/2013 | Schultze ................. H04L 41/00 |
| | | 709/223 |
| 2013/0173685 A1* | 7/2013 | Huang .................. H04L 61/103 |
| | | 709/201 |
| 2013/0205028 A1* | 8/2013 | Crockett ............... G06F 9/5027 |
| | | 709/226 |
| 2013/0232492 A1* | 9/2013 | Wang ..................... G06F 9/4856 |
| | | 718/1 |
| 2013/0239106 A1 | 9/2013 | Srinivasan et al. |
| 2013/0263125 A1* | 10/2013 | Shamsee ............ G06F 9/45558 |
| | | 718/1 |
| 2013/0268643 A1 | 10/2013 | Chang et al. |
| 2013/0346619 A1* | 12/2013 | Panuganty ............... H04L 41/12 |
| | | 709/226 |
| 2014/0007089 A1* | 1/2014 | Bosch .................... G06F 9/4856 |
| | | 718/1 |
| 2014/0040991 A1* | 2/2014 | Potonniee ................ H04L 63/08 |
| | | 726/4 |
| 2014/0064056 A1* | 3/2014 | Sakata ..................... H04L 41/00 |
| | | 370/216 |
| 2014/0075433 A1 | 3/2014 | Kotton |
| 2014/0129833 A1* | 5/2014 | Ferris ..................... G06Q 20/02 |
| | | 713/165 |
| 2014/0143422 A1* | 5/2014 | Joseph ...................... G06F 8/60 |
| | | 709/226 |
| 2014/0244845 A1 | 8/2014 | Liu et al. |
| 2014/0244847 A1* | 8/2014 | Pouyllau ............... H04L 47/724 |
| | | 709/226 |
| 2014/0297889 A1* | 10/2014 | Dong .................. G06F 9/45533 |
| | | 709/245 |
| 2014/0317616 A1* | 10/2014 | Chu ..................... G06F 9/45533 |
| | | 718/1 |
| 2014/0359134 A1* | 12/2014 | Yoshida ................ G06F 9/4856 |
| | | 709/226 |
| 2014/0365549 A1 | 12/2014 | Jenkins |
| 2015/0063166 A1* | 3/2015 | Sif ....................... G06F 9/45558 |
| | | 370/254 |
| 2015/0081863 A1* | 3/2015 | Garg ........................ H04L 41/00 |
| | | 709/223 |
| 2015/0106806 A1* | 4/2015 | Reddy ..................... G06F 16/24 |
| | | 718/1 |
| 2015/0178108 A1 | 6/2015 | Tarasuk-Levin et al. |
| 2015/0178110 A1 | 6/2015 | Li et al. |
| 2015/0281111 A1* | 10/2015 | Carl ......................... H04L 47/70 |
| | | 709/226 |
| 2015/0350101 A1* | 12/2015 | Sinha ......................... G06F 9/00 |
| | | 709/226 |
| 2015/0350188 A1* | 12/2015 | Gilpin .................... H04L 63/083 |
| | | 726/9 |
| 2015/0381723 A1* | 12/2015 | Sancheti ................. G06F 3/0619 |
| | | 709/217 |
| 2016/0043991 A1* | 2/2016 | Eizadi .................. H04L 61/1511 |
| | | 709/245 |
| 2016/0088096 A1* | 3/2016 | Quiriconi .............. H04W 12/04 |
| | | 709/219 |
| 2016/0134584 A1* | 5/2016 | Lang ................... G06F 9/45558 |
| | | 709/220 |
| 2016/0142338 A1* | 5/2016 | Steinder .............. H04L 41/0813 |
| | | 709/226 |
| 2016/0218938 A1* | 7/2016 | Gupte ................... G06F 9/5072 |
| 2016/0330196 A1* | 11/2016 | El Marouani .......... G06F 21/57 |
| 2016/0359955 A1* | 12/2016 | Gill ..................... H04L 67/1097 |
| 2016/0380817 A1* | 12/2016 | Agarwal ............. H04L 41/0813 |
| | | 709/221 |
| 2016/0380906 A1* | 12/2016 | Hodique ............ G06Q 30/0206 |
| | | 709/226 |
| 2017/0005923 A1* | 1/2017 | Babakian ............... H04L 69/324 |
| 2017/0005967 A1* | 1/2017 | Simpson ............... G06Q 10/101 |
| 2017/0063673 A1* | 3/2017 | Maskalik ................ H04L 45/38 |
| 2017/0134307 A1* | 5/2017 | Clarke ..................... H04L 47/82 |
| 2017/0142024 A1* | 5/2017 | Fromentoux ........... H04L 47/70 |
| 2017/0289060 A1* | 10/2017 | Aftab ................... H04L 67/1097 |
| 2017/0293500 A1* | 10/2017 | Molina ............... G06F 9/45558 |
| 2017/0324728 A1* | 11/2017 | Gilpin .................... H04L 63/083 |
| 2017/0329639 A1* | 11/2017 | Morper .................. G06F 9/5072 |
| 2017/0359410 A1* | 12/2017 | Thakkar .................. H04L 67/10 |
| 2017/0371628 A1* | 12/2017 | Zhao ......................... G06F 8/315 |
| 2018/0046482 A1* | 2/2018 | Karve ................. G06F 9/45558 |
| 2018/0046509 A1* | 2/2018 | Arata ......................... G06F 9/46 |
| 2018/0084084 A1* | 3/2018 | Sharma .................. H04L 67/34 |
| 2018/0191859 A1* | 7/2018 | Sharma .................. H04L 67/32 |
| 2018/0205600 A1* | 7/2018 | Burton ................ H04L 67/1097 |
| 2018/0287938 A1* | 10/2018 | Han ......................... H04L 45/74 |
| 2018/0295036 A1* | 10/2018 | Krishnamurthy ... G06F 11/3006 |
| 2018/0341768 A1 | 11/2018 | Marshall et al. |
| 2019/0294477 A1* | 9/2019 | Koppes ................. G06F 9/5072 |
| 2019/0317783 A1* | 10/2019 | Lemay ................ G06F 9/45558 |
| 2019/0394658 A1* | 12/2019 | Baillargeon ............ H04L 67/10 |

FOREIGN PATENT DOCUMENTS

| | | | | |
|---|---|---|---|---|
| WO | WO-2016001502 A1 * | 1/2016 | ............. | H04L 47/70 |
| WO | WO-2019183366 A1 * | 9/2019 | ............ | G06F 9/5077 |

OTHER PUBLICATIONS

Dictionary, "acceptable", 2020 (Year: 2020).*
Merriam-Webster, "able", 2020 (Year: 2020).*
Merriam-Webster, "definite", 2020 (Year: 2020).*
Merriam-Webster, "function", 2020 (Year: 2020).*
Benson et al., "CloudNaaS: A Cloud Networking Platform for Enterprise Applications", 2011 (Year: 2011).*
Chun et al., "PlanetLab: An Overlay Testbed for Broad-Coverage Services", 2003 (Year: 2003).*
Goyal et al., "A Lightweight Secure Cyber Foraging Infrastructure for Resource-Constrained Devices", 2004 (Year: 2004).*
Lee et al., "Vehicular Cloud Networking: Architecture and Design Principles", 2014 (Year: 2014).*
Trivisonno et al., "SDN-based 5G Mobile Networks: Architecture, Functions, Procedures and Backward Compatibility", Abstract, 2014 (Year: 2014).*
Wikipedia, "Dynamic Host Configuration Protocol", 2021 (Year: 2021).*
"Deploying MaveriQ on OpenStack", RADCOM Presentation, Nov. 2016.
International PCT Search Report dated May 3, 2018 for PCT International Application No. PCT/IL2018/050036 filed Jan. 10, 2018.

(56) References Cited

OTHER PUBLICATIONS

U.S. Office Action dated Jun. 11, 2019 for U.S. Appl. No. 15/867,758, filed Jan. 11, 2018.
U.S. Office Action dated Nov. 13, 2019 for U.S. Appl. No. 15/867,758, filed Jan. 11, 2018.
Notice of Allowance dated Aug. 5, 2020 for U.S. Appl. No. 15/867,758, filed Jan. 11, 2018.
Mirriam-Webster, Definition of "role", 2019 (Year 2019).

\* cited by examiner

METHOD OF PROVIDING CLOUD COMPUTING INFRASTRUCTURE

RELATED APPLICATIONS

The present application claims benefit under 35 U.S.C. 119(e) of U.S. Provisional Application 62/456,693 filed Feb. 9, 2017, the disclosure of which is incorporated herein by reference.

FIELD

Embodiments of the invention relate to methods and systems for configuring communications between resources of a cloud application infrastructure

BACKGROUND

Cloud computing refers to information processing technology that enables a user to realize and use an application for performing information processing tasks without having to provide, maintain, or manipulate, an underlying physical infrastructure on which the application runs. The various resources that are assembled to cooperate in executing the tasks are referred to as "virtual resources", and are typically abstract conceptualizations of familiar physical devices, colloquially referred to as "bare-metal" devices or resources. A virtual resource may for example be a virtual computer, generally referred to as a virtual machine (VM), a virtual router, virtual load balancer, a virtual agent, or any type of container. However, whereas a virtual resource may correspond to a bare metal resource, the virtual resource is a mental construct characterized by functionalities that it is required to provide and parameters that define the virtual resource's capacities to provide the functionalities. The functionalities and parameters, which are defined by text statements in a suitable language, may not necessarily stand in one to one correspondence with functionalities and parameters of any particular bare-metal device. A hypervisor or containerizer controls the virtual resource to access and use, subject to constraints of the characterizing functionalities and parameters, physical assets from one or more bare-metal resources that the virtual resource requires to provide its functionalities. The virtual resources in a virtual infrastructure operate and communicate with each other in a virtual environment referred to as a cloud to support an application, which may be referred to as a cloud based application that performs a desired information processing task.

Creating, referred to as "spinning up", and assembling a collection, referred to as a "stack", of virtual resources to provide a cloud based infrastructure for supporting a cloud application is a complex task. Various enterprises have developed and provide services for automatically or semi-automatically spinning up and configuring, referred to as "orchestrating", virtual resources into cloud based infrastructures. A popular orchestration module referred to as "Heat" operates on textual templates that describe virtual resources and their relationships in a cloud infrastructure to orchestrate the infrastructure. The textual templates may be written in YAML (Yet Another Markup Language) and are referred to as heat orchestration templates conventionally referred to by the acronym "HOT".

SUMMARY

An aspect of an embodiment of the disclosure relates to providing Orchestration Script for orchestrating a cloud infrastructure, which comprises a stack of templates that define virtual resources for the infrastructure, The Orchestration Script comprises a package management system (PMS) having code, referred to as a "Spinneret", that operates to construct a virtual network over which the virtual resources, when instantiated, communicate with each other to execute a desired data processing task of the cloud infrastructure.

In an embodiment, the Spinneret is configured to receive notifications of instantiations of virtual resources of the infrastructure and register the instantiations in a Spinneret registration database (R-DB). A notification of an instantiation of a resource received by the Spinneret may include an identification (ID) profile of the instantiated virtual resource. A virtual resource ID profile comprises an internet protocol (IP) address of the virtual resource, and may comprise additional ID data, such as by way of example, a name, role, and/or geographical region associated with the virtual resource that may be advantageous in forging, as discussed below, communication links for the virtual network. During orchestration, upon receiving notification of and registering instantiation of a first resource, Spinneret searches the Spinneret R-DB for a second resource registered with Spinneret that provides data accessible at the IP address of the second resource that may be used as input data required by the first resource. If a second resource is found, Spinneret operates to provision the first resource with the IP address of the second resource so that the first resource may communicate with and receive data from the second resource that the first resource requires. In addition to an IP address Spinneret may, optionally provide the first resource with other information characterizing the second resource, such as listening port and credential information, which the first resource may require but, generally does not and cannot receive during conventional instantiation of virtual resources. If a suitable second resource is not found, Spinneret repeats the search as additional resources are instantiated and registered with Spinneret during orchestration until a suitable second resource is found for the first resource.

By automatically provisioning resources with IP addresses from which they may receive required data during orchestration of a cloud infrastructure, a Spinneret in accordance with an embodiment enables an infrastructure to self-assemble with a communication network that it requires to function.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

BRIEF DESCRIPTION OF FIGURES

Non-limiting examples of embodiments of the invention are described below with reference to figures attached hereto that are listed following this paragraph. Identical features that appear in more than one figure are generally labeled with a same label in all the figures in which they appear. A label labeling an icon representing a given feature of an embodiment of the invention in a figure may be used to reference the given feature. Dimensions of features shown in the figures are chosen for convenience and clarity of presentation and are not necessarily shown to scale.

DETAILED DESCRIPTION

In the following detailed description, flow diagrams outline a procedure by which a Spinneret operates to provide a virtual infrastructure with a communication network in accordance with an embodiment of the disclosure. By way of example, the infrastructure is described as comprising VMs, however, embodiments of the disclosure are not limited to virtual infrastructures comprising only VMs. A Spinneret in accordance with an embodiment of the disclosure may orchestrate a virtual infrastructure comprising a combination of any of various different types of virtual resources, such as by way of example any one or more of the virtual resources noted above, and may also be configured to orchestrate a hybrid infrastructure comprising virtual and bare-metal resources.

Figure 1A:
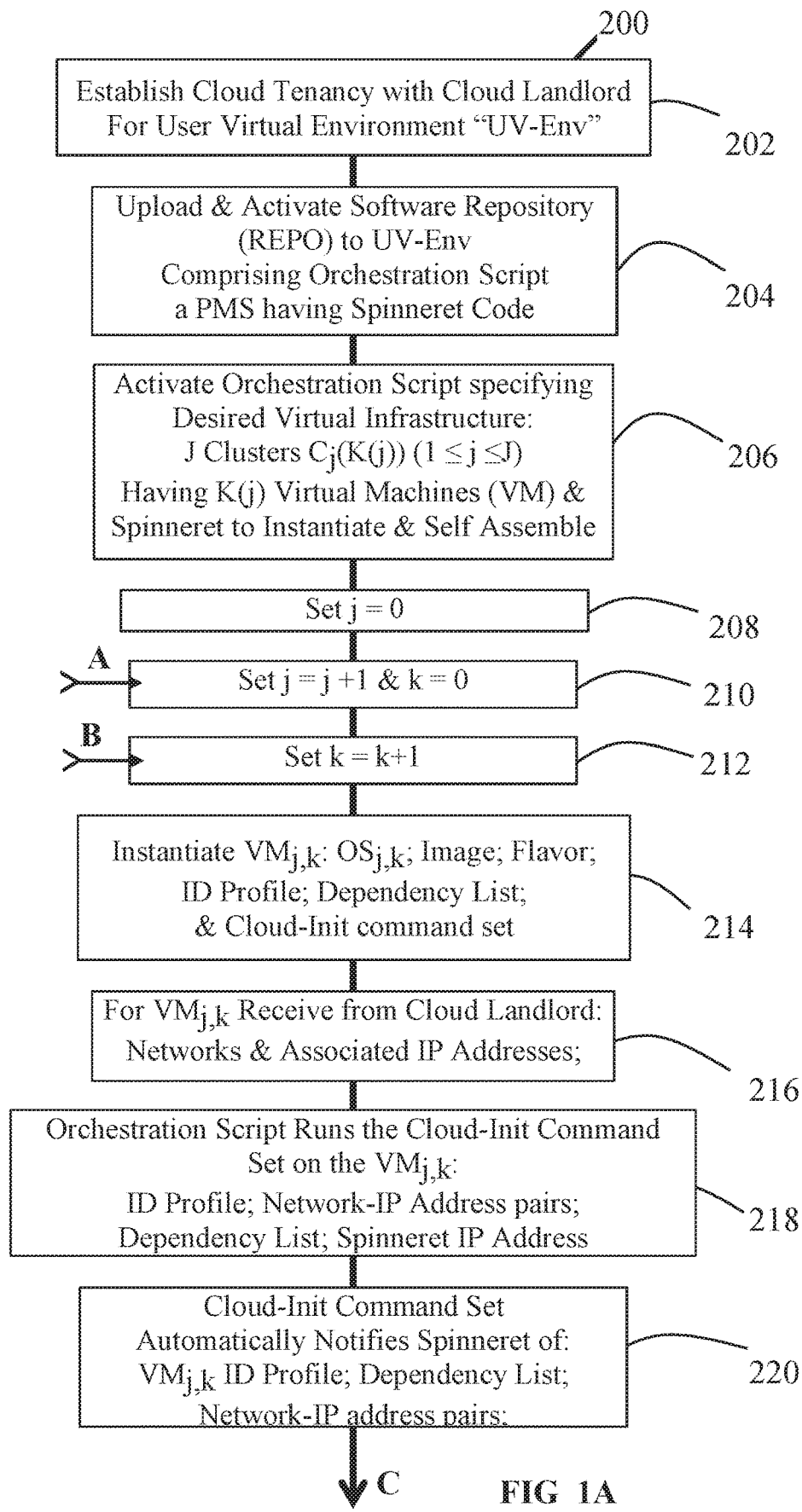
FIGS. 1A and 1B show a flow diagram by which a Spinneret instantiated from a Spinneret template orchestrates a cloud infrastructure comprising a plurality of clusters of virtual machines and a self-assembled communication network, in accordance with an embodiment of the disclosure
Figure 1B:
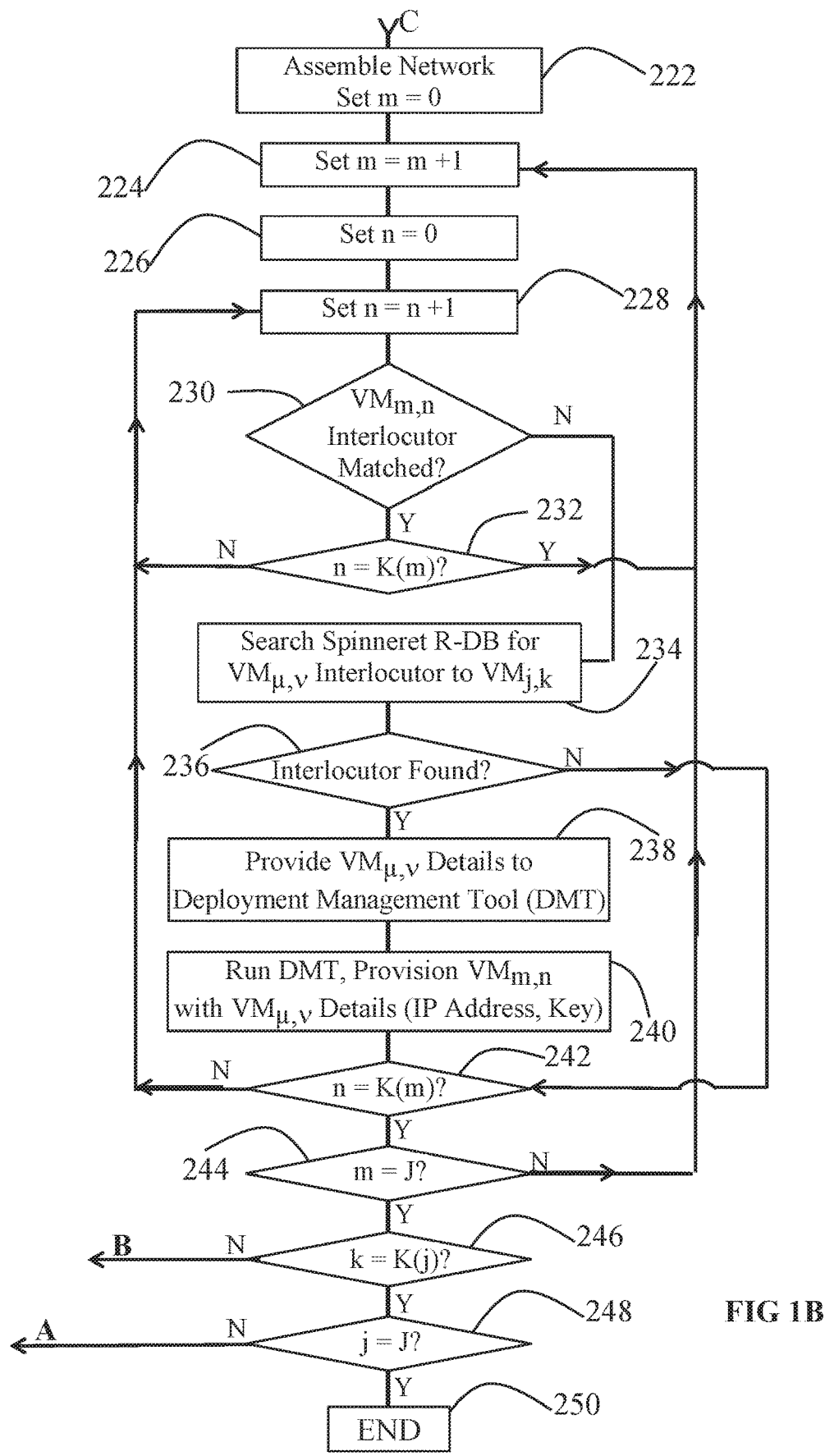

FIGS. 1A and 1B show a flow diagram of a procedure 200 by which Orchestration Script and a Spinneret cooperate to instantiate a virtual infrastructure and construct a communication network over which virtual resources in the virtual infrastructure communicate with each other, in accordance with an embodiment of the disclosure. The virtual infrastructure is assumed to comprise a plurality of J clusters $C_j(K(j)$ $1 \leq j \leq J$ of VMs, where a j-th cluster comprises $K(j)$ virtual machines $VM_{j,k}$, $1 \leq k \leq K(j)$.

In a block 202 a user accesses a public or private cloud owner, a "cloud landlord", to receive authorization to establish tenancy and a user virtual user environment "UV-Env" in the landlord's cloud. In a block 204 the user optionally uploads to the UV-Env a software repository (REPO) comprising orchestration script for establishing a virtual infrastructure in the cloud and a package management system (PMS) of software tools for implementing the orchestration in accordance with an embodiment of the disclosure. The PMS comprises code for running a Spinneret in accordance with an embodiment.

In a block 206 the user activates the orchestration script to instantiate a desired virtual infrastructure comprising $C_j(K(j))$ clusters of virtual machines $VM_{j,k}$, and activates the Spinneret to construct a communication network over which the virtual machines communicate. Upon activation, Spinneret requests and receives an IP address, optionally from the cloud landlord, for use in communicating with VMs in the virtual infrastructure established in user environment UV-Env by operation of the user REPO and PMS. In a block 208 the orchestration script sets an index j equal to zero and in a block 210 sets j=(j+1) and initiates the index k to zero. In a block 212 Spinneret increases k to (k+1).

In a block 214 a virtual infrastructure manager (VIM), optionally provided by the cloud landlord for use by the user PMS, spins up a virtual machine $VM_{j,k}$ (initially at this stage with j=k=1) and optionally provides it with an operating system $OS_{j,k}$, image, flavor, an ID profile, dependency list, and a Cloud-Init command set. The ID profile may comprise at least one of or any combination of more than one of a name of the $VM_{j,k}$, a role of $VM_{j,k}$, a dependency list, a geographical region that may be associated with the $VM_{j,k}$, and/or additional data that may be advantageous for determining with which other VMs in the virtual network $VM_{j,k}$ should be in communication. In a block 216, $VM_{j,k}$ receives networks and IP addresses from the cloud landlord for use in communicating with other VMs in the virtual infrastructure being instantiated, in accordance with an embodiment of the disclosure.

In a block 218 the orchestration script runs the Cloud-Init command set on the $VM_{j,k}$ to initialize the $VM_{j,k}$ with the operating system $OS_{j,k}$, image, flavor, ID profile, and dependency list. In a block 220 the Cloud-Init command set accesses Spinneret via the Spinneret IP address, and automatically notifies Spinneret of the instantiation of $VM_{j,k}$. The notification comprises providing the Spinneret with the network and IP address pairs provided for $VM_{j,k}$ by the cloud landlord, the $VM_{j,k}$ dependency list, and optionally at least some of the data comprised in the ID profile of the $VM_{j,k}$. Spinneret may store the notification information in the Spinneret registration database R-DB.

Optionally, in a block 222 shown in FIG. 1B, Spinneret proceeds to assemble a communication network via which $VM_{j,k}$ will communicate with other VMs that the orchestration script spins up to instantiate the desired virtual infrastructure, and in block 222 initializes a cluster search index m to zero. In a block 224 Spinneret increases search index m by one. In a block 226 Spinneret initializes a VM search index n to 0, and in a block 228 increases value of index n by one. In a decision block 230 Spinneret may determine whether $VM_{m,n}$ in the desired virtual infrastructure has been matched to at least one other VM, with which to communicate and receive data that $VM_{m,n}$ requires to perform functionalities that $VM_{m,n}$ is intended to provide to the desired virtual infrastructure. A VM that provides data to $VM_{m,n}$ may be referred to as an interlocutor VM for $VM_{m,n}$. Virtual machine $VM_{m,n}$ may be said to be matched to an interlocutor if $VM_{m,n}$ has an IP address of the interlocutor so that it may access the interlocutor VM for data.

If in decision block 230 Spinneret determines that $VM_{m,n}$ has been matched to all interlocutor VMs from which it may need to receive data, Spinneret may proceed to a decision block 232 to determine if the VM search index n is equal to the maximum number $K(m)$ of VMs in the m-th cluster $C_m(K(m))$. If $n \neq K(m)$ Spinneret returns to block 228 to increase n by one and proceed again to decision block 230. If, on the other hand $n=K(m)$, Spinneret returns to block 224 to increase cluster search index m by one and proceed again from block 226 to decision block 230.

If in decision block 230 Spinneret determines that $VM_{m,n}$ has not been matched to all its interlocutors, Spinneret may proceed to a block 234. In block 234 Spinneret searches the Spinneret database R-DB to locate a virtual machine $VM_{\mu,\nu}$ that may function as an interlocutor for $VM_{m,n}$. Spinneret may determine whether or not a virtual machine $VM_{\mu,\nu}$ is an interlocutor for $VM_{m,n}$ based on the dependencies and/or ID profiles of $VM_{m,n}$ and/or $VM_{\mu,\nu}$.

In a decision block 236, if Spinneret has located an appropriate interlocutor, $VM_{\mu,\nu}$, in R-DB for $VM_{m,n}$, Spinneret may proceed to a block 238 to run a Deployment Management Tool (DMT), optionally included in the user PMS, to execute code to provide $VM_{m,n}$ with the IP address of $VM_{\mu,\nu}$ so that $VM_{m,n}$ may communicate with $VM_{\mu,\nu}$ and receive data that it needs from $VM_{\mu,\nu}$.

After running the DMT Spinneret may proceed to a decision block 242 to determine if VM search index n is equal to the maximum number $K(m)$ of VMs in the m-th cluster $C_m(K(m))$. If $n \neq K(m)$ Spinneret may return to block 228 to increase n by one and again proceed through block 230 towards block 242. If, on the other hand, $n=K(m)$ Spinneret may proceed to a decision block 244 to determine if cluster search index m is equal to the maximum number J of clusters in the desired virtual infrastructure that Spinneret is spinning up and orchestrating. If m≠J, Spinneret may return to block 224 to increase cluster search index m by one to proceed towards block 244 and search the R-DB for an interlocutors for VMs in cluster (m+1).

If on the other hand, Spinneret finds that m=J in decision block 244 Spinneret may proceed to a decision block 246 to determine if cluster index k is equal to the maximum number K(j) of VMs in the j-th cluster $C_j(K(j))$. If k≠K(j), Spinneret may return to block 212 where the orchestration script operates to increase VM index k by one to spin up virtual machine $VM_{j,(k+1)}$ of cluster $C_j(K(j))$ and proceed towards block 246. If on the other hand in decision block 246 Spinneret determines that k=K(j) Spinneret may proceed to a decision block 248.

In decision block 248 Spinneret may determine whether or not j is equal to J, the maximum number of VM clusters $C_j(K(j))$ to be spun up in the desired virtual infrastructure. If j is less than J Spinneret may return to block 212 where the orchestration script operates to increase j by one and again proceed towards block 248 and spin up a next cluster $C_{j+1}(K(j+1))$ of virtual machines for the desired virtual infrastructure. If on the other hand in decision block 248 Spinneret has found that j=J, Spinneret has finished its job of spinning up clusters $C_j(K(j))$ 1≤j≤J for the desired infrastructure and connecting the clusters and virtual machines to a communication network over which they may communicate to cooperate in performing the functions of the infrastructure. Spinneret may then proceed to a block 250 to end spinning up and orchestrating the desired infrastructure.

If in decision block 236, Spinneret has not located an appropriate interlocutor, $VM_{\mu,\nu}$, in R-DB for $VM_{m,n}$, Spinneret may proceed directly to decision block 242 to determine if cluster search index n should be increased as discussed above or to continue to decision block 244, 246 and/or 248 to determine whether or not to increase an index m, k, or j or whether Spinneret has completed it job and may proceed to block 250.

It is noted that in the above description the orchestration script and Spinneret operate to instantiate an infrastructure having initially J clusters $C_j(K(j))$ 1≤j≤J having respectively K(j) virtual resources. Following initial instantiation it may be advantageous to increase or decrease a number of clusters and/or a number of VMs in a cluster. In an embodiment following initial instantiation of the infrastructure the Spinneret remains "awake" and "listens" for changes in the constellation of VMs in the virtual infrastructure. If a new VM is added to the virtual infrastructure, the orchestration script runs the Cloud-Init Command set of the new VM as in block 218 and proceeds to block 220 to notify Spinneret of the "arrival" of the new VM. Spinneret may then proceed, optionally similarly as described in blocks 222-250, to determine interlocutors for the new VM and provide the new VM with IP addresses of the interlocutors. If a given VM is retired from the virtual infrastructure, communications connections between the given VM and other VMs in the virtual infrastructure are also retired. As a result, some of the remaining VMs may be completely or partially orphaned or deprived of needed input data. In an embodiment of the disclosure Spinneret may operate to reconfigure connections between VMs in the virtual infrastructure by searching its R-DB, optionally similarly as described in blocks 222-250, to locate substitutes for the retired VM and provide the IP addresses of the substitute VMs to the deprived VMs.

By reconfiguring connections between VMs in a user infrastructure as VMs are added to or retired from the infrastructure, a Spinneret in accordance with an embodiment of the disclosure provides a cloud user's infrastructure with real time dynamic scaling out and scaling in respectively and elastic response to changes in demand for the infrastructure's functionalities.

There is therefore provided in accordance with an embodiment of the disclosure a method of providing an infrastructure of virtual resources in a cloud to support a desired cloud based application, the method comprising: instantiating a virtual management module in the cloud comprising, or having access to a memory; instantiating a plurality of virtual resources, each resource having an operating system (OS) and internet protocol (IP) address and configured after instantiation to transmit to the management module its IP address and role and provide a functionality for the infrastructure that supports performance of the cloud based application; wherein the management module is configured to: store in the memory the IP addresses and roles that it receives; search the memory to provide a first instantiated virtual resource with a second instantiated virtual resource with which the first virtual resource may communicate to receive data that the first resource requires to provide the functionality that the first resource provides the infrastructure; and operate to provide the first resource with the IP address of the second resource. Optionally, the resource is characterized by a role.

In an embodiment the management module is configured to monitor the infrastructure of virtual resources after orchestration of the infrastructure to determine if a resource is added or retired from the infrastructure. Optionally, the management module is configured to search the memory to identify an IP address of a virtual resource suitable as an interlocutor for the added virtual resource, and if an interlocutor is found to provide the interlocutor IP address to the added virtual resource.

Providing the first resource with the IP address of the second resource optionally comprises providing a Deployment Management Tool with the IP address of the second resource and running the Deployment Management Tool to provision the first resource with the IP address of the second resource.

In an embodiment, instantiating a virtual management module and a plurality of virtual resources comprises providing a master template having templates for the management module and the virtual resources. Optionally, the templates are Heat Orchestration Templates (HOT).

There is further provided in accordance with an embodiment a system for providing a communications network over which an infrastructure comprising a plurality of virtual resources in a cloud communicate, the system comprising: a memory; and a management module configured to: communicate with virtual resources of the plurality of virtual resources after they are instantiated to receive their respective IP addresses and roles; store in the memory IP addresses and roles that it receives; and based at least in part on instantiation of a virtual resource of the plurality of virtual resources, search the memory to identify an IP address of a virtual resource suitable to function as an interlocutor for the instantiated virtual resource; and if an interlocutor is found, provide the interlocutor IP address to the instantiated virtual resource. Optionally, the management module is configured to perform the search during orchestration of the infrastructure.

In an embodiment the management module is configured to monitor the infrastructure after the infrastructure is orchestrated to determine whether a new virtual resource is added to or removed from the infrastructure. Optionally the management module is configured to search the memory to identify an IP address of a virtual resource suitable to function as an interlocutor for the new virtual resource and if an interlocutor is found, provide the interlocutor IP address to the new virtual resource.

In the description and claims of the present application, each of the verbs, "comprise" "include" and "have", and conjugates thereof, are used to indicate that the object or objects of the verb are not necessarily a complete listing of components, elements or parts of the subject or subjects of the verb.

Descriptions of embodiments of the invention in the present application are provided by way of example and are not intended to limit the scope of the invention. The described embodiments comprise different features, not all of which are required in all embodiments of the invention. Some embodiments utilize only some of the features or possible combinations of the features. Variations of embodiments of the invention that are described, and embodiments of the invention comprising different combinations of features noted in the described embodiments, will occur to persons of the art. The scope of the invention is limited only by the claims.

The invention claimed is:

1. A method comprising:
    instantiating in a cloud a virtual management module comprising a memory or access to the memory;
    instantiating a plurality of virtual resources to orchestrate an infrastructure of instantiated virtual resources in the cloud to support a cloud based application, each of the instantiated virtual resources having an operating system (OS), and internet protocol (IP) address at which a first instantiated virtual resource is accessible for communication with a second instantiated virtual resource, and
    comprising instructions which when executed causes each of the instantiated virtual resources to transmit to the management module their IP address and an identification (ID) profile, and
    provide a functionality for the infrastructure, that supports performance of the cloud based application;
    wherein the management module comprises management module instructions which when executed cause a processor to:
        store in the memory the IP addresses and ID profiles that the management module receives;
        search the memory to identify a first instantiated virtual resource of the plurality of instantiated virtual resources with a second instantiated virtual resource of the plurality of instantiated virtual resources, the second instantiated virtual resource being a source of data that the first instantiated virtual resource requires to provide the functionality that the first instantiated virtual resource provides the infrastructure; and
        operate to provide the first instantiated virtual resource with the IP address of the second instantiated virtual resource to enable the first instantiated virtual resource to communicate with the second instantiated virtual resource and receive the required data that the first instantiated virtual resource requires.

2. The method according to claim 1 wherein the ID profiles include roles, and the management module uses the roles to identify the first instantiated virtual resource and the second instantiated virtual resource.

3. The method according to claim 1 wherein the management module instructions when executed cause the processor to monitor the infrastructure of the instantiated virtual resources after orchestration of the infrastructure to determine if a third instantiated virtual resource is added or retired from the infrastructure.

4. The method according to claim 3 wherein the management module instructions when executed cause the processor to:
    search the memory to identify an IP address of a fourth instantiated virtual resource for providing data that the added third instantiated virtual resource requires to provide a functionality that the added third instantiated virtual resource provides the infrastructure; and
    to provide the identified IP address to the added third instantiated virtual resource.

5. The method according to claim 1 wherein operating to provide the first instantiated virtual resource with the IP address of the second instantiated virtual resource comprises providing a Deployment Management Tool with the IP address of the second instantiated virtual resource and running the Deployment Management Tool to provision the first instantiated virtual resource with the IP address of the second instantiated virtual resource.

6. The method according to claim 1 wherein instantiating a virtual management module and a plurality of instantiated virtual resources comprises providing a master template having templates for the management module and the instantiated virtual resources.

7. The method according to claim 6 wherein the templates are Heat Orchestration Templates (HOT).

8. A system comprising:
    a memory; and
    a management module having instructions, which when executed by a processor cause the processor to:
        communicate with each of a plurality of virtual resources orchestrated in a cloud after they are instantiated to receive their respective roles and IP addresses at which they are accessible for communications, that they transmit to the management module;
        store in the memory the IP addresses and the respective roles that the module receives; and
        based at least in part on instantiation of a first virtual resource of the plurality of virtual resources, search the memory to identify an IP address of a second instantiated virtual resource of the plurality of instantiated virtual resources, the second instantiated virtual resource comprising data that the first instantiated virtual resource requires to provide a functionality for an infrastructure; and
        provide the IP address of the second instantiated virtual resource to the first instantiated virtual resource to enable the first instantiated virtual resource to communicate with the second instantiated virtual resource to receive the required data from the second instantiated virtual resource.

9. The system according to claim 8 wherein the instructions when executed by the processor cause the processor to perform the search during orchestration of the infrastructure.

10. The system according to claim 9 wherein the instructions when executed by the processor cause the processor to monitor the infrastructure after the infrastructure is orchestrated to determine whether a new instantiated virtual resource is added to or removed from the infrastructure.

11. The system according to claim 10 wherein the instructions when executed by the processor cause the processor to search the memory to identify an IP address of a instantiated virtual resource as a source of data that the new instantiated virtual resource requires, and, to provide the identified IP address to the new instantiated virtual resource to use as a destination address to request the required data.

12. A method comprising:
instantiating a plurality of virtual resources to orchestrate an infrastructure of instantiated virtual resources in a cloud that provide respective functionalities to support a cloud based application,
each instantiated virtual resource having an operating system (OS) and internet protocol (IP) address at which a first instantiated virtual resource is accessible for communication with a second instantiated virtual resource and an identification (ID) profile;
during orchestration, for each instantiated virtual resource of the plurality of instantiated virtual resources, automatically storing the IP address and the ID profile of the each instantiated virtual resource in a memory;
searching the memory to locate the IP address and the ID profile of the second instantiated virtual resource, that is a source of data that the first instantiated virtual resource requires to provide the functionality that the first instantiated virtual resource provides; and
providing the first instantiated virtual resource with the IP address of the second instantiated virtual resource for use by the first instantiated virtual resource as a destination IP address to communicate with the second instantiated virtual resource and request the required data.

13. The method according to claim 12 and comprising following initial orchestration of the infrastructure, when a third instantiated virtual resource is retired from the plurality of resources,
searching the memory for an IP address of a substitute instantiated virtual resource to serve as a source of the required data that the retired third instantiated virtual resource provided to a fourth instantiated virtual resource orphaned by the retirement; and
providing the orphaned fourth instantiated virtual resource with the IP address of the substitute instantiated virtual resource for use by the orphaned fourth instantiated virtual resource as a destination IP address to communicate with the substitute instantiated virtual resource and request the required data.

14. The method according to claim 12 and comprising following initial orchestration of the infrastructure, when a fifth instantiated virtual resource is added to the plurality of instantiated virtual resources to provide a functionality to support the cloud based application:
searching the memory to locate an IP address of a sixth instantiated virtual resource comprised in the infrastructure to serve as a source of data that the added fifth instantiated virtual resource requires to provide the functionality; and
providing the added fifth instantiated virtual resource with the located IP address for use by the added fifth instantiated virtual resource as a destination IP address to communicate with the sixth instantiated virtual resource and request the required data.

15. The method according to claim 2 wherein the first and second resources comprise dependency lists and the module uses the dependency lists to identify the first instantiated virtual resource and the second instantiated resource.

* * * * *